United States Patent
Schick

(10) Patent No.: US 7,410,587 B2
(45) Date of Patent: Aug. 12, 2008

(54) LIQUID HANDLING FOR FILTRATION AND PREPARATIVE CHROMATOGRAPHY

(75) Inventor: Karl G. Schick, Madison, WI (US)

(73) Assignee: Scilog, Inc., Middleton, WI (US)

( * ) Notice: Subject to any disclaimer, the term of this patent is extended or adjusted under 35 U.S.C. 154(b) by 429 days.

(21) Appl. No.: 10/910,065

(22) Filed: Aug. 3, 2004

(65) Prior Publication Data

US 2006/0027500 A1    Feb. 9, 2006

(51) Int. Cl.
*B01D 61/00* (2006.01)
*B01D 11/00* (2006.01)
*B01D 24/46* (2006.01)
*C02F 1/28* (2006.01)

(52) U.S. Cl. .................. 210/651; 210/650; 210/656; 210/90; 210/645; 210/137; 210/97

(58) Field of Classification Search .................. 210/90, 210/97, 650–651, 652, 636, 102, 134, 142, 210/656, 137, 96.1, 108, 645
See application file for complete search history.

(56) References Cited

U.S. PATENT DOCUMENTS

| | | | | |
|---|---|---|---|---|
| 4,921,610 | A | * | 5/1990 | Ford et al. .................. 210/636 |
| 4,931,186 | A | * | 6/1990 | Ford et al. .................. 210/636 |
| 4,994,188 | A | * | 2/1991 | Prince .................. 210/636 |
| 5,047,154 | A | * | 9/1991 | Comstock et al. .................. 210/636 |
| 5,057,197 | A | * | 10/1991 | Perry et al. .................. 210/652 |
| 5,069,792 | A | * | 12/1991 | Prince et al. .................. 210/637 |
| 5,252,218 | A | * | 10/1993 | Muraldihara et al. .................. 210/636 |
| 5,431,811 | A | * | 7/1995 | Tusini et al. .................. 210/90 |
| 5,490,936 | A | * | 2/1996 | Leupold et al. .................. 210/636 |
| 5,558,774 | A | * | 9/1996 | Tonelli et al. .................. 210/612 |
| 5,738,792 | A | * | 4/1998 | Schoendorfer .................. 210/651 |
| 5,958,244 | A | * | 9/1999 | Hartmann .................. 210/650 |
| 6,113,791 | A | * | 9/2000 | Hartmann .................. 210/636 |
| 6,350,382 | B1 | | 2/2002 | Schick |
| 6,383,385 | B1 | * | 5/2002 | Brinke-Seiferth et al. 210/433.1 |

(Continued)

FOREIGN PATENT DOCUMENTS

FR    2 785 830 A1    5/2000

(Continued)

OTHER PUBLICATIONS

Bowers & Haschmeyer, "A Versatile Small-Volume Ultrafiltration Cell", Analytical Biochemistry, 25, pp. 549-556, 1968.

(Continued)

*Primary Examiner*—Ana M Fortuna
(74) *Attorney, Agent, or Firm*—Cook, Alex, McFarron, Manzo, Cummings & Mehler, Ltd.

(57) ABSTRACT

A method and system are provided for high-precision separation of pharmaceutical or biotechnology liquids. The separation can be in accordance with direct flow filtration, tangential flow filtration or preparative chromatography. Movement of the pharmaceutical or biotechnology liquid within a flow path is controlled according to a selected pattern. Selected patterns include automatically and progressively increasing the flow rate within the unit, automatically and progressively increasing the pressure within the unit or initially proceeding according to a relatively high constant flow rate and switching to a relatively high constant pressure at a time when a given parameter is attained.

20 Claims, 10 Drawing Sheets

U.S. PATENT DOCUMENTS

| | | | |
|---|---|---|---|
| 6,423,230 B2 * | 7/2002 | Ilias et al. | 210/636 |
| 6,607,669 B2 | 8/2003 | Schick | |
| 6,712,963 B2 | 3/2004 | Schick | |
| 6,852,219 B2 * | 2/2005 | Hammond | 210/222 |
| 2004/0004717 A1 * | 1/2004 | Reed | 356/338 |
| 2006/0027500 A1 * | 2/2006 | Schick | 210/650 |

FOREIGN PATENT DOCUMENTS

| | | |
|---|---|---|
| JP | 07068257 | 3/1995 |
| JP | 10076143 | 3/1998 |
| WO | WO 99/02245 | 1/1999 |

OTHER PUBLICATIONS

Blatt, Robinson & Bixler, "Membrane Ultrafiltration: The Diafiltration Technique and its Application to Microsolute Exchange and Binding Phenomena", Analytical Biochemistry, 26, pp. 151-173, 1968.

Blatt, et al., "Rapid Salt Exchange by Coupled Ultrafiltration and Dialysis in Anisotropic Hollow Fibers", Separation Science, 7(3) pp. 271-284, 1972.

Technical Bulletin: "Microgon Techniques for Processing Uniform Latex Particles," Microgon Inc., 1992.

Operating Instructions: "MiniKros® Sampler System," Microgeon Inc., 1995.

Technical Bulletin: "MidGee™ Cross Flow Filters," A/G Technology Corporation, 1996.

Technical Bulletin: "The MiniKros® Sampler System," Spectrum Microgon, May 1996.

UltraTec™ Filtration System, "Operations Manual Version," 1.28, SciLog, Inc., Apr. 1997.

Si-Hassen, et al., "Optimisation of an Intermittant Cross-Flow Filtration Process of Mineral Suspensions," Journal of Membrane Science, 118 (1996) 185-198.

Carere, "Study of Hydrodynamic Parameters in the Cross-Flow Filtration of Guar Gum Pseudoplastic Solutions", Journal of Membrane Science, 174 (2000) 135-145.

Webpage of HyClone at www.hyclone.com, printed May 2002.

Webpage of Integrate Solution for Biopharmeaceutical Fluid Handling at www.tc-tech.com, printed May 2002.

Filvek, "Volumetric Disposable Liquid Filling System Schematic", Innovative Technology Practical Solutions, Brochure, circa 2002.

* cited by examiner

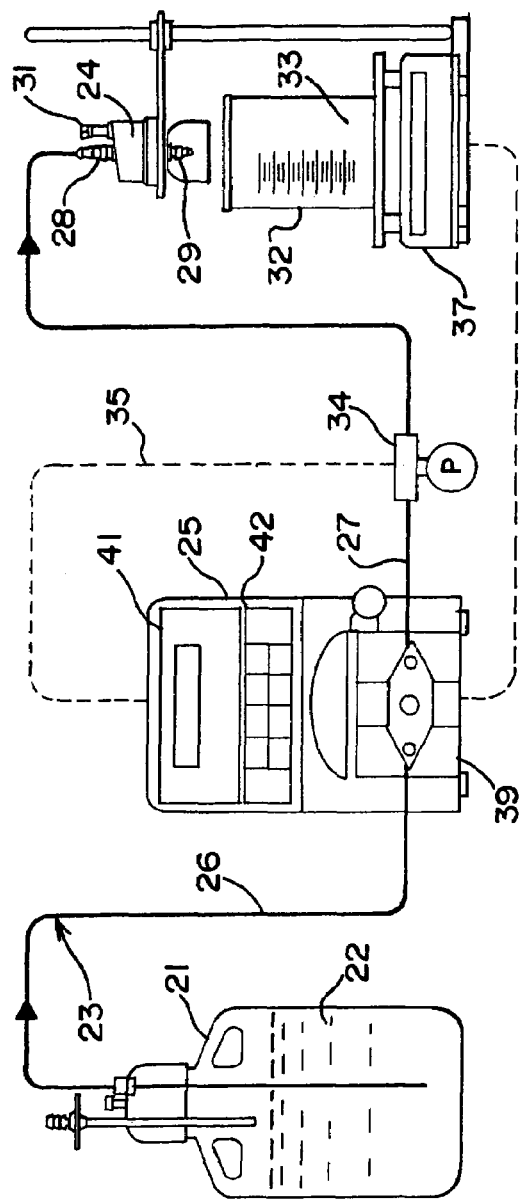
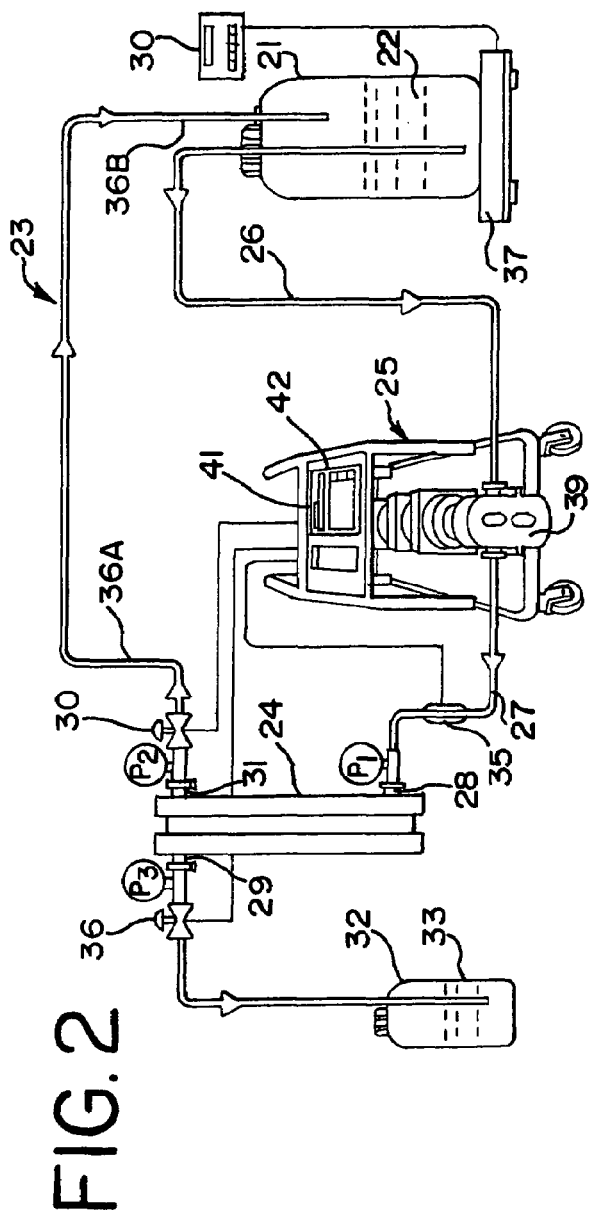
FIG.1
FIG.2

LIQUID HANDLING FOR FILTRATION AND PREPARATIVE CHROMATOGRAPHY

BACKGROUND OF THE INVENTION

The invention generally relates to improved, automated liquid handling methods applicable to filtration and preparative chromatography of liquids for use in the pharmaceutical and biotechnology industries. With the invention, a variety of separation techniques are handled in a yield-enhancing automated manner. The invention enhances separation processes such as tangential flow filtration (TFF) (also called cross flow filtration), direct flow filtration (DFF) (also called dead end filtration or normal flow filtration), as well as preparative chromatography applications.

In the pharmaceutical and biotechnology industries, the use of preparative chromatograpy, direct flow filtration (DFF) and tangential flow filtration (TFF), including micro-,ultra-, nano-filtration and diafiltration are well-established methods for the separation of dissolved molecules and/or suspended particulates.

In direct flow filtration (DFF), a filtration device is used that has one inlet and one outlet. The total (100%) solution volume is forced through a porous filter. DFF devices are typically single-use devices. Such membrane filters or depth filters are commercially available in different filter area sizes as well as different pore sizes. Depending upon the selected pore size, molecules or particulates smaller than the average membrane pore size will pass (together with solvent) through the filter. Thus, direct flow filtration (DFF) devices allow for the selective removal of particulates, bacteria, viruses, cell debris and large macro molecules.

In contrast, tangential flow filtration (TFF) devices have one inlet, one retentate outlet and at least one permeate outlet. In TFF, the retentate is repeatedly re-circulated with the objective of improving filtration efficiency and enhancing the permeate yield. The re-circulated retentate solution pathway runs parallel to the membrane surface and is pumped past the membrane with sufficient velocity to ensure a surface cleaning action. Furthermore, a sufficiently high trans-membrane pressure (TMP) or differential pressure (DP) is applied across the filtration device to ensure an optimal permeate flux across the membrane. However, only a relatively small amount of permeate is collected during each retentate volume-pass, and thus a significant processing time is typically associated with TFF procedures.

For optimal results, both DFF and TFF demand careful attention to filter porosity, filter area as well as required differential pressures and selected pump rates. However, filtration devices tend to clog when used over an extended period of time and must be timely replaced. Clogging of a filtration device occurs: (1) when the membrane pores become obstructed, typically with trapped cells, particulate matter, cell debris or the like or (2) when the feed channel (into a TFF device) becomes obstructed by solids or colloidal material and/or cell debris. This clogging of the feed channel or membrane pores results in a decreased liquid flow across the porous filter membrane. The result is a change in system pressure which, if not properly addressed, runs the risk of serious detriment to the operation which incorporates the filtration procedure.

Attempts to address these concerns and difficulties have included the development and use of semi-automated filtration systems. These types of systems utilized either manually controlled recirculation pumps or pumps which are controlled by a timing device which will stop pump action after a preset filtration time has elapsed. It is also typical to monitor line pressure through the use of an analog or a digital pressure gauge, usually located between the pump and the filter device. When the gauge reads a certain line pressure level, typically one specified by the manufacturer of the filter device, the filtration must be stopped and the old filter must be replaced with a new one. At times, it is not possible to accurately predict the time at which the pumping action must be stopped in order to avoid overtaxing the filter device. Accordingly, prior art systems which rely solely on timing are not entirely satisfactory.

Prior art filtration technology such as that referred to above also is disadvantageous because it is typically very labor intensive. This prior technology also has additional, serious shortcomings for safe and efficient operation. One shortcoming is that the filtrate yield frequently is not quantitative because of unpredictable solution particulate loads. Thus, for a given re-circulation volume and pump rate, the filtrate yield may differ from case to case, depending upon the amount of pore-sized particulate suspended in the recirculation solution. Another shortcoming is a direct result of back pressure build up due to clogging and gel layer formation. Rapid back pressure build up at times causes bursting of the filter membrane and/or the filter housing, resulting in costly spillage and/or filtrate contamination. Excessive filter inlet pressure also frequently leads to blow-off of tube connections such as at the filter inlet, resulting in costly spillage of retentate, for example. Because of these types of shortcomings, manual and semi-automated filtration systems need to be constantly monitored, which greatly contributes to the high labor intensity of such approaches.

With specific reference to TFF, the use of TFF for concentrating bio-molecules such as dilute protein solutions has a number of challenges associated with same that are related to solution viscosity changes during the TFF process. As the TFF operation progresses, solvent (typically water and small, undesirable buffer species) are removed from the dilute starting material and are collected as permeate. Under normal conditions, the selected porosity of the TFF device prevents the protein molecules from crossing the filter membrane. The progressive removal of solvent gives rise to a steady increase in the retentate (e.g. protein) concentration accompanied by a steady increase in retentate viscosity. The concentration and viscosity changes cause a general increase in the TFF system pressure, which complicates efforts at safe and optimal completion of the TFF operation.

It would be beneficial to achieve safe and optimal TFF operation, which implies a TFF procedure that maximizes permeate collection in the shortest time, within safe operating parameters, without generating excessive wall concentrations of product (e.g. protein) at the membrane surface, all while taking into account shortcomings of TFF components such as pumps, valves and the like. For example, selection of the TFF pump may be important in reducing destruction of retentate due to pump shear and or heat denaturation. These considerations come into play in attempting to achieve safe and optimum TFF operation. Typically, current TFF practices require frequent, manual adjustment of system pressured and/or flow rates over many hours in attempting to achieve safe and optimal TFF operations.

Filtration arrangements as described in Schick U.S. Pat. No. 5,947,689, incorporated hereinto by reference, provide for quantitative capability with TMP pressure monitoring. Such a filtration approach allows for rapid and safe filtration without concern of losing product, particularly pharmaceutical products or biotechnology products which can be extremely expensive, difficult to replace, and can represent the investment of many hours of prior processing. This patent describes coaxing the maximum life out of a filtration device without running the risk of generating operational conditions which can lead to excessive back pressure build up near the end of the life of the filtration device.

Filtration arrangements also are described in Schick U.S. Pat. No. 6,350,382 for effecting at least safe and automated TFF operational capabilities. Schick U.S. Pat. No. 6,607,669 describes effecting at least safe and automated TFF operational capabilities including automated diafiltration capabilities. Each of these patents and other references noted herein are incorporated by reference hereinto.

Filtration (DFF) rates which are too fast cause premature filter plugging or filter failure and related problems. Because of this, operators of filtration and column loading units have been known to set the equipment at an initially low filtration rate or flow rate and gradually increase the rate. Alternatively, the units are set up to provide a very large filtration surface area in order to thereby reduce the pump loading at the filter. Other current solutions include setting a low pump rate and maintaining same low throughout the loading cycle, which of course results in a lengthy load time. By another approach, a higher initial pump rate is selected, the filtering progress is monitored, and the pump rate is manually decreased, leading to a very uneconomic situation.

Previous liquid handling methods for direct flow filtration, tangential flow filtration and/or chromatographic column loading often have proceeded according to either a constant low pump rate or a constant safe pump pressure. These are time-consuming and typically require operator monitoring and/or intervention.

Accordingly, there is a need for improvements in liquid handling for valuable and vulnerable pharmaceutical and biotechnology compositions, components and products. There is also a need for such liquid handling to proceed with minimal operator monitoring requirements while providing safe, automated and optimal separation capabilities.

SUMMARY OF THE INVENTION

The system and process of the present invention address problems such as those noted herein by controlling operation of a liquid-moving pump unit, such as by entering pressure and/or pump rate changes with operator-defined conditions and/or parameters. The changes can be tailored for the particular liquid being handled and for the objectives of the procedure being carried out. With methods and systems as described herein, any of DFF, TFF and column loading can be carried out by constant pump rate followed by constant pump pressure approaches, DFF can be carried out by automatic and progressive pump rate or pump pressure increases, and TFF can be carried out by automatic and progressive pump rate and/or pump pressure decreases. These allow for enhanced efficiency and minimal operator involvement once the filtration or column loading procedure is initiated. Significant yield enhancements of up to 30 percent can be achieved by these approaches which are described herein.

In a preferred embodiment, filtration of pharmaceutical or biotechnology products involves automatically increasing pump rate over time until a maximum selected parameter is achieved.

A further preferred embodiment automatically decreases pump rate over time, while another embodiment automatically decreases transmitted pressure over time, and a further embodiment automatically decreases both pump rate and transmitted pressure over time.

In another preferred embodiment, transmitted pressure is automatically increased over time, typically in association with a feedback loop in the control approach.

Another preferred embodiment follows a constant flow rate approach by which the flow of pharmaceutical or biotechnological material remains constant until a user-defined pressure limit is reached. Once this limit is reached, the pumping activity automatically switches to provide constant pressure loading. Typically, the pump output is modulated in order to maintain the pressure limit. Termination is appropriately implemented when a user-defined parameter is achieved.

It is a general aspect and object of the present invention to provide improved automated, liquid filtration and/or preparative chromatography by a method and/or a system suitable for precisely handling pharmaceutical and/or biotechnology materials.

An aspect of the present invention is to provide an improved method and/or system for exacting filtration through an automatic pump rate increase or decrease over time until a selected stop criteria or event is achieved, which typically enhances yield of collected components.

Another aspect of this invention is to provide an improved method and/or system for filtration which increase or decrease flow pressure until a selected stop criteria or event is achieved, typically enhancing yield.

Another aspect of the present invention is to provide an improved filtration and/or preparative chromatography method and/or system which is automated and need not be constantly monitored by an operator, thereby being characterized as having very low labor intensity.

Another aspect of the present invention is to provide improved filtration and/or preparative chromatography which includes the use of a constant flow rate until a user-defined pressure limit is reached, followed by modulating pump output to provide a constant pressure mode.

Another aspect of the present invention is to provide an improved concentration method and/or system which includes adjusting flow rate or pressure in either a stepwise or a continuous manner whereby the flow rate or pressure increases according to a selected scheme.

Another aspect of the present invention is to provide an improved liquid filtration and/or preparative chromatography system which includes the use of use interface controls for entering desired changes in pressure and/or rate, including over a user-defined time interval and/or volume limit in order to control the progress and safety of tangential flow filtration, direct flow filtration or chromatography column loading procedures.

Another aspect of the present invention is to provide an improved filtration and/or chromatography system which includes determining total process solution pumped through the column or filter.

These and other objects, features and advantages of the present invention will be clearly understood through a consideration of the following detailed description.

BRIEF DESCRIPTION OF THE DRAWINGS

In the course of this description, reference will be made to the attached drawings, wherein:

FIG. 1 is a somewhat schematic illustration of an embodiment of an apparatus or system of the type discussed herein;

FIG. 2 is a somewhat schematic illustration of another embodiment of an apparatus or system of the type discussed herein;

DESCRIPTION OF THE PARTICULAR EMBODIMENTS

Figure 3:
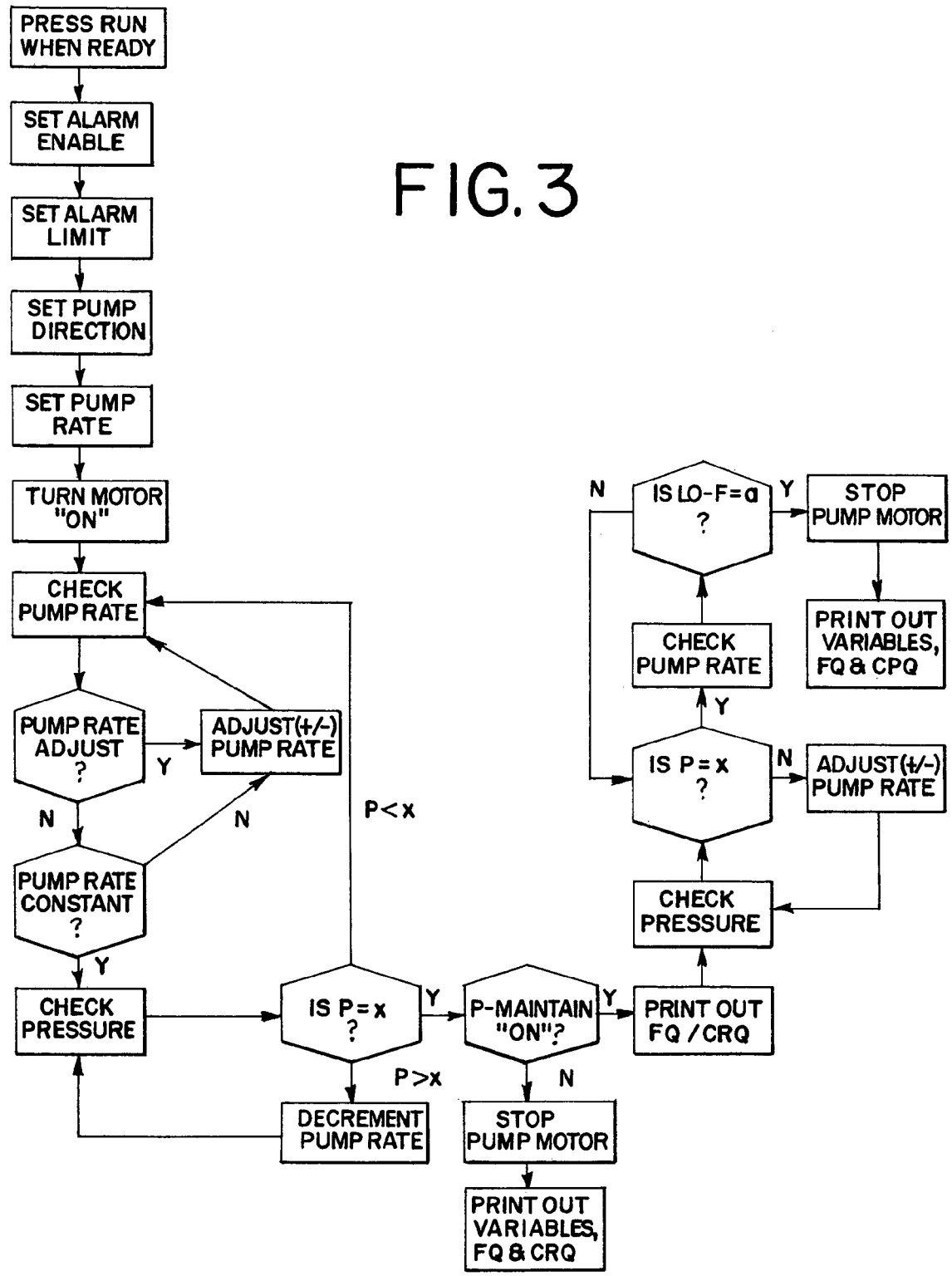
FIG. 3 is a schematic data flow chart typical of a system as discussed herein, such being associated with a system for maintaining constant pump rate followed by constant pressure conditions after a user-defined pressure limit has been reached.

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Tangential flow filtration (TFF), direct flow filtration (DFF), at times referred to as dead end filtration (DEF), as well as preparative chromatography are used in the separation and purification of bio-molecules and are widely employed in the biopharmaceutical industry. In both filtration and preparative chromatography, a dilute process solution, containing the bio-molecules of interest as well as undesirable contaminants, must be purified. This typically involves the preferential removal of either the contaminants or the desired constituent from the process solution. Frequently, multiple filtration steps and repeated preparative chromatography runs are required to achieve the desired degree of product purity and concentration. By some estimates, 70% of the total production cost of desired bio-molecules is expended in the separation and purification steps. Thus, significant economic advantages can be derived from improved methods of filtration and preparative chromatography.

In both TFF as well as in DFF, excessively high filtration rates, particularly during the initial start-up phase, can cause a premature filter failure or filter plugging. With each occurrence, the filtration procedure is interrupted and the filtration device needs to be replaced or re-conditioned. Typically, the total process solution volume, including the volume already filtered, must be re-filtered.

A similar issue exists in loading process solution, containing the bio-molecules of interest as well as contaminants, onto a preparative chromatography column. The chromatography column contains an insoluble matrix (stationary phase), which preferentially retains either the desired bio-molecules or the undesirable contaminants, thereby achieving separation and purification. Loading process solution onto the column is accomplished by pumping the solution at an appropriate rate that avoids excessive column inlet pressure and undesirable stationary phase compression. The loading pump rate must be experimentally determined for a given process solution and stationary phase. Frequently, the loading pump rate must be reduced from its initial setting, when solution constituents retained by the chromatographic stationary phase cause an increase in column flow resistance. Thus, with increasing amounts of retained material on the stationary phase, the column inlet pressure increases. In order to avoid excessive column pressure increases and associated stationary phase compaction, the loading pump rate must be reduced.

A system particularly designed for filtration or column loading and the like is illustrated in FIG. 1. A reservoir 21 for containing a liquid 22 to be filtered or loaded is shown in liquid-passing communication with a conduit system, generally designated at 23. A separation unit 24 also is positioned along the conduit system, as is a processor-controlled pump unit 25.

In this illustrated arrangement, the conduit system 23 includes various lengths of conduit or tubing, such as a conduit length 26 by which liquid 22 passes out of the reservoir 21 by the action of the pump unit 25 on the conduit. In a typical application, the conduit system is hard-piped or comprises scientific or medical tubing which is acted upon by movement-generating components of the pump unit 25. This conduit length 26 opens into a conduit length 27 to complete passage of the liquid 22 from the reservoir to the separation unit 24. Tubing includes PharMed and Masterflex® silicone pump tubing.

With more particular reference to the separation unit 24, this can be a filtration unit. It also can be a loading column, for example. Unit 24 can include an inlet 28, a primary outlet 29, and a secondary outlet 31. A collector 32 is preferably provided for collecting a target material 33 such as a filtrate (or permeate) from the primary outlet 29. Retentate or the like which flows out of the secondary outlet 31 can be returned to the reservoir by a recycle component (not shown) of the conduit system 23.

Separation unit 24 can take the form of a tangential or cross-flow filtration device. Other functional units can be used, including those characterized as having an ultrafiltration column and columns suitable for preparative chromatography. These units may be of the type wherein the liquid to be filtered encounters a porous membrane. The preferred filtration unit is of the type which incorporates porous hollow fibers, and the flow of liquid is of a generally tangential type or cross-flow type. These filtration units are of types which are generally known. They have a variety of pore sizes which are selected to achieve the desired separation action. Commercially available filtration units include those which are stacked plate and spiral devices which use flat sheet membranes. Others include tubular devices, as well as shell and tube devices which use hollow fiber membranes. The separation unit 24, for example, can be a dead end filter such as those available from Pall, Millipore, Santorious, Microgen, A/G, and Asahi Kasei.

Proper functioning of these separation units is severely hampered as the viscosity and concentration of the liquid fed to them increases. If not properly addressed, this can result in inefficiencies, including the development of an excessive gel layer of solids and/or micromolecules. This buildup often is intensified by reducing flow rate in an attempt to address increased viscosity, which gradually and persistently decreases the filtration efficiency and capacity of the filter unit. If proper measures are not taken to effectively address fluctuation and inadequate monitoring of trans-membrane pressure, such as those in accordance with the invention, yield and processing times will be negatively impacted.

In addition, if left unchecked, increasing line pressure or TMP will eventually cause failure and/or leakage in the closed system. For example, the filter unit and tubing of the conduit system can fail due to excessive internally applied pressure. Alternatively or additionally, seals between the conduit system and other components of the apparatus can fail, and/or the tubing can be blown off of a seat or connection point. Such events will lead to loss of valuable components and potential contamination of the theretofore closed system.

The system illustrated in FIG. 1 further includes at least one pressure sensor 34. Preferably, each pressure sensor is an electronic pressure sensor which detects pressure within the conduit system at its particular location. Means 35 also are provided for transmitting pressure data from pressure sensor 34 to the processor-controlled pump unit 25. In this manner, the processor-controlled pump unit 25 has virtually instantaneous access to this pressure data. Suitable in-line, electronic liquid pressure sensors are generally known and are available. An example is the Flow-Through™ pressure sensor, available from Scilog Inc. Often, such a pressure sensor is electronically connected to a preamplifier, which in turn is mounted to an in-out port on the processor-controlled pump unit 25.

One or more valve units (not shown) can be provided for adjusting pressures within the system. Each such valve can be associated with a sensor such as pressure sensor 34 order to provide the ability to adjust pressure in the conduit system. Also, the rate of flow into separation unit 24 can be monitored by a flow meter (not shown). When provided, each valve unit and flow meter can be in signal transmitting communication with the processor.

When desired, weight data can be input to the processor-controlled pump unit. FIG. 1 illustrates an electronic top-loading scale or load cell 37 which can be set up to transmit signals between a scale controller 30 (FIG. 2) and the pump unit 25. Load cell 37 is positioned and adjusted for measuring the weight of the material 33 within the collector 32. These weight data are electronically transferred to the processor-controlled pump unit 25. Various electronic balances can be used. These include the electronic top-loading balances and scales made by manufactures such as Mettler® —Toledo, Sartorius®, and Ohaus® commercially available load cells.

Referring more particularly to the processor-controlled pump unit 25, the illustrated device includes a pump head 39. Pump head can be a peristaltic pump, a lobe pump or other precision pump head. The pump head can be of a two-channel variety, such as a Tandem (Trademark) peristaltic pump head available from Scilog, Inc., Madison, Wis. Two-channel peristaltic pump heads in this regard are described in U.S. Pat. No. 5,340,290, incorporated by reference hereinto. Whatever type of pump unit is used, it is important that it be exceptionally accurate so as to impart a precise flow rate to the liquid in accordance with instructions received from the processor component of the processor-controlled pump unit 25. For example, the Tandem pump can accurately move from between about 2 ml/min to about 2200 ml/min per channel.

The processor-controlled pump unit 25 includes a processor component 41. A control and display panel 42 provides the interface between the user and the processor 41. Included is a display and a series of operator activated controls. These controls allow the operator to input parameters and instructions in accordance with the particular needs of the liquid being subjected to the separation capabilities of the filtration system or other separation unit. The illustrated front panel user interface includes an alphanumeric liquid crystal display (LCD) and a membrane keypad to select operational modes and alarm settings.

Suitable keypad arrangements can be provided. They can include a "soft" key to scroll up or down through the menus. They can include "hard"0 keys whose function does not change. These keys are used for basic control and programming. A RUN control key executes the selected operational mode and starts the pump 39. A STOP control key interrupts current operational mode and stops the pump. A RATE control key sets the pump rate in ml/min, liters/min or kg/min. A TIME control key displays motor pulses per second. A double arrowhead control key orders clockwise or counterclockwise pump direction. A SWITCH control key and an EXIT control key typically are provided. A STAR (*) control key can be used in pump rate recalibration and also for changing the parameter displayed by the processor-control pump.

Figure 7:
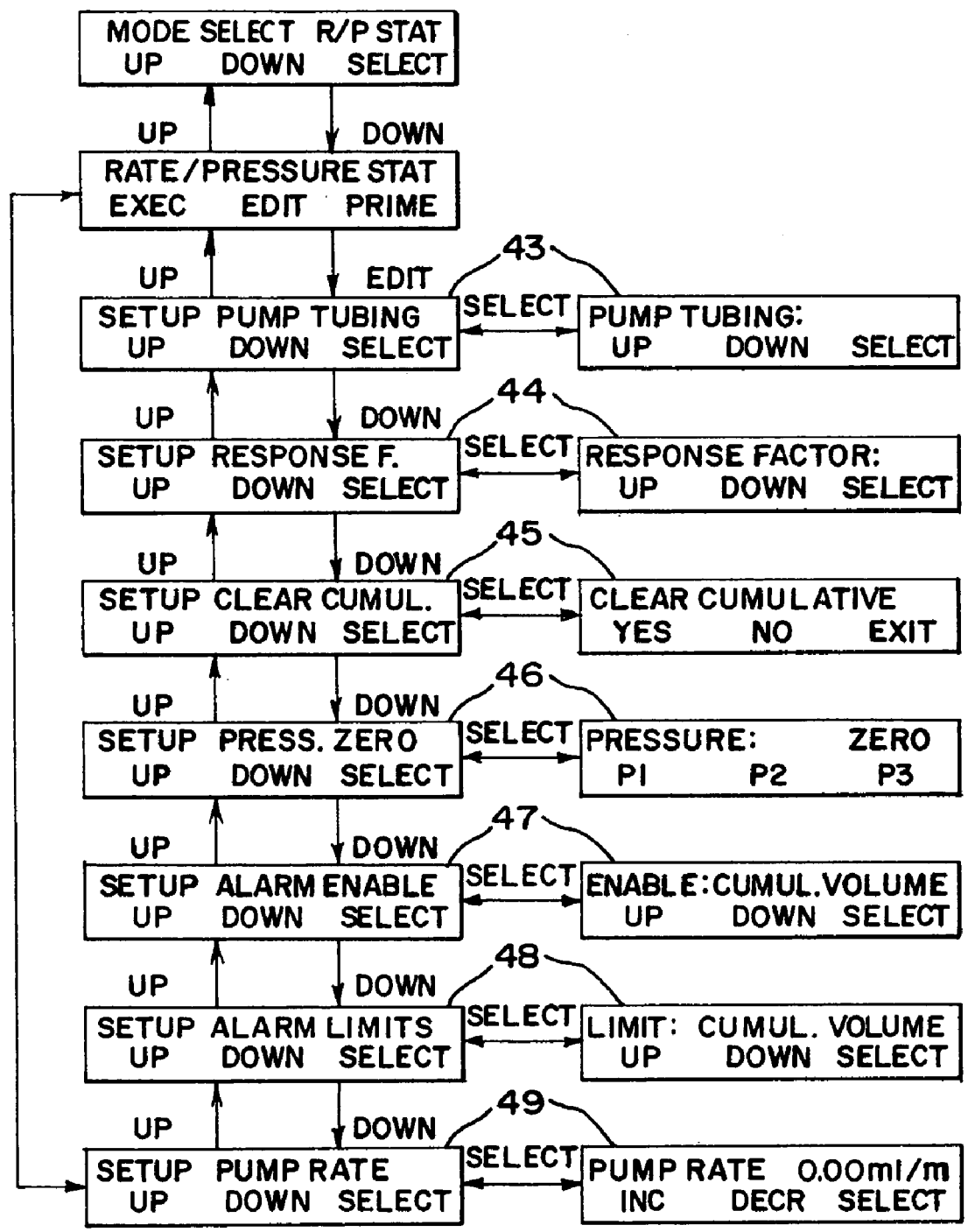
FIG. 7 schematically provides a menu overview of software suitable for use in the programmable delivery unit.

FIG. 7 shows a preferred main menu for the logic of the processor, which can control data channel circuitry, which consists of five operational modes. "Up" and "Down" keys are used to scroll through the main menu. Pressing a "Select" key enters a chosen operational mode and enters the first submenu level which provides access to the "Exec" and "Edit" functions. In the "Edit" submode, the pump parameters are selected for filter application. Pressing "Exit" returns to the main menu.

The illustrated operation mode implements a constant or static filtration feed rate. Operation is substantially the same for preparative chromatography. This is an approach for constant pump rate followed by constant pump pressure. A user-defined pump rate can be selected. In the "Edit" submode at 43 the pump tubing can be selected, and the factory installed calibration tables which relate the pump output in ml/min to pump motor speed are selected.

In the constant pump rate mode, pump rate in terms of ml/min are selected. A user-programmable pressure limit is set to the operator's desired static pressure. The unit can include software for setting alarm parameters can be selected, such as: Cumulative (Retentate) Volume; Run (Pump) Time; Low Pressure (Low Filter Back Pressure); High Pressure (High Filter Back Pressure); Filtrate (or Permeate) Weight Alarm; as well as two concentration (e.g. UV and conductivity) alarms.

A "Response Factor" setting at 44 is provided for varying the responsiveness of the pump unit. A "Clear Cumulative" setting 45 resets counters including cumulative volume for retenate or the like, one time and filtrate weight. A pressure zero setting allows the operator to return filter backpressure readings to zero for all three pressure sensors. An alarm enable setting 47 allows the operator to select among available alarm options. Available options include: disable the alarm; enable an auditory alarm; stop pump; or maintain. The disable mode shuts off the alarm. The enable mode turns on an auditory alarm. The stop mode stops the pump and provides an auditory alarm when operator-defined alarm limits are exceeded.

The "Pressure Maintain" setting switches from a flow rate control to a pressure control, such being done at a limit that was selected by the operator, while maintaining that pressure by adjusting pump motor speed. The alarm limits setting 48 allows the operator to assign alarm limits for different alarm conditions. These can include cumulative volume of retentate or the like (in a volume unit such as milliliters); run time; low pressure to monitor system linkage; high pressure (filter backpressure); low flow (in a flow unit such as ml/min); and filtrate and/or permeate weight (such as in grams). High and low pressure alarms are related to the pressure source chosen in the setup mode. Any such alarm condition is triggered when the alarm limit is exceeded, and alarm limits can be independently set to provide combinations of alarms. A pump rate setting 49 is selected, typically in terms of ml/min. The unit allows the pump rate to be changed "on the fly" by pressing the RATE key, making the change to the desired pump rate, changing the pump rate to the chosen value, and pressing "Select".

Figure 8:
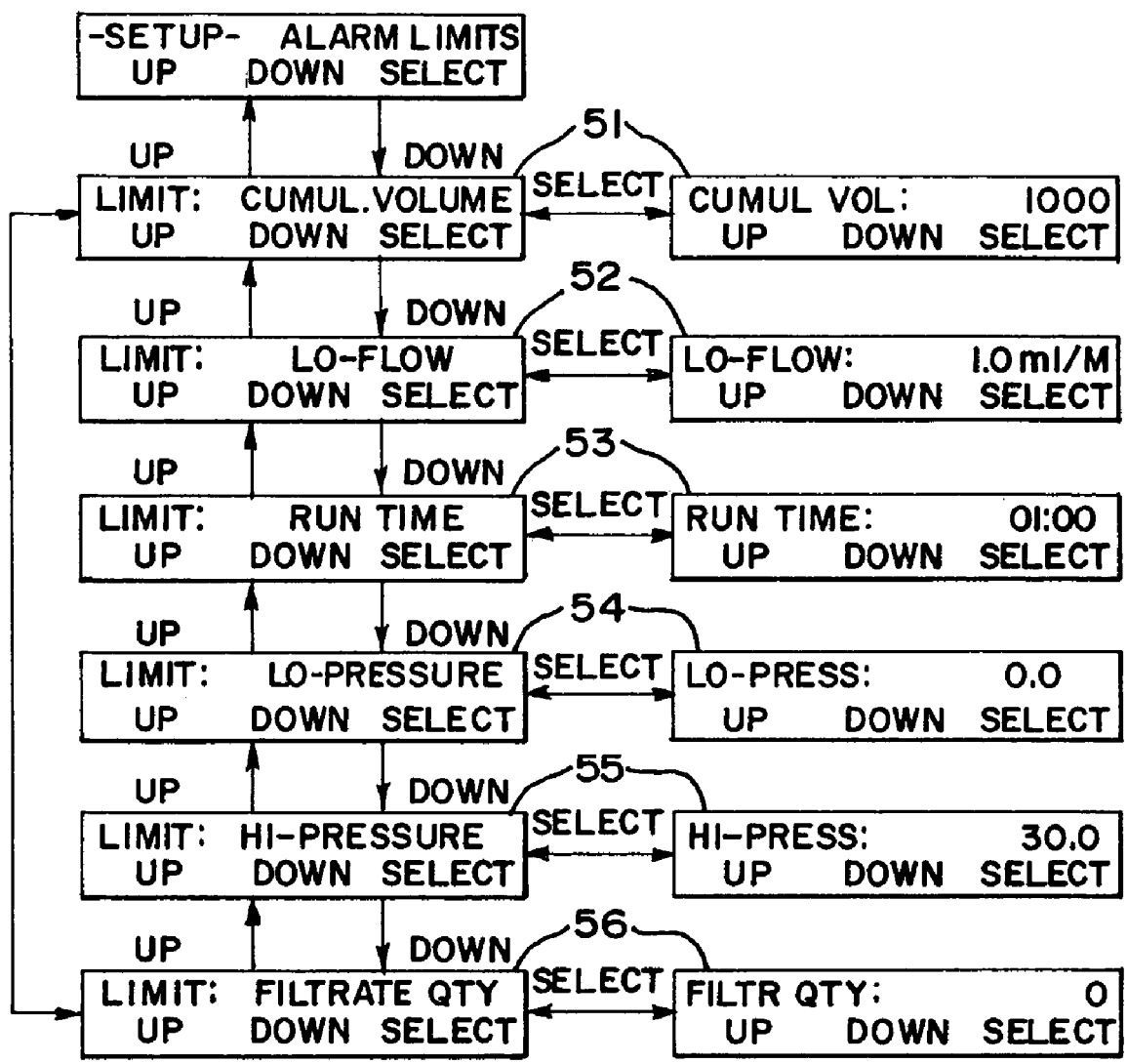
FIG. 8 schematically provides a menu overview of software suitable for setting alarm limits.

FIG. 8 illustrates the ability to assign alarm limit values for six different alarm conditions. The alarm is triggered when the alarm limit set by the operator is achieved. A cumulative volume setting 51 represents the total volume of process solution (based on the feed rate) that is pumped through the filtration device or the loading column. For example, if it is set as shown in FIG. 8 at 1,000 ml or 1 liter, the unit will initiate the alarm and/or stop the pump when one liter of retentate or the like had been pumped through the separation unit 24. This permits, for example, defining permeate yield in terms of the amount of retentate recirculated through a filtration system.

A low flow setting 52 is also illustrated. At the end of a static pressure portion of the process, low flow of material represents a critical alarm condition. In this operational mode, the unit will detect any filter backpressure increases in a source pressure sensor, which is due to slow filter plug-up. This then will automatically decrease the pump rate to maintain the selected high pressure limit setting once the high "Pressure Maintain" alarm has been triggered. The low flow parameter typically is in ml/min and represents the lowest pump rate before the pump shuts down. The low flow parameter is preferably set at a value just below the desired minimum feed flow rate.

A run time setting 53 allows the operator to set a timer for processing the solution being filtered or subjected to preparative chromatography. In essence, this allows clear defining of processing time. The low pressure setting 54 typically is set at between about 3 and about 5 psi units below the high pressure setting. Then, the low pressure alarm is triggered when a sudden filter backpressure drop occurs after rising above this setting. Such a change in the filter backpressure usually indicates a system leak, such as pump tubing has come off of a filter connection.

A high pressure setting comes into play when the "Pressure Maintain" option of the alarm enable setting 47 discussed above has been chosen. This is the value at which the pump will change from the static flow rate mode to the static pressure mode in this embodiment. If the "Pump Stop" option of the alarm limit setting 48 has been chosen, this chosen value is the point at which the alarm is triggered. A filtrate weight setting 56 allows the operator to set the weight of material 33 in the collector 32. The unit will give an alarm indication that the desired weight of target material 33 has been collected. Alternatively or additionally, the pump will be stopped.

A system particularly designed for tangential flow filtration, diafiltration and direct flow (or dead end) filtration is illustrated in FIG. 2. The basic liquid conduit system is similar to one described in connection with FIG. 1. This embodiment is particularly well suited for monitoring and controlling trans-membrane pressure (TMP) and/or differential pressure (DP) while monitoring and/or controlling feed rate, permeate collection rate and recirculation rate in this illustrated embodiment. Pressure sensors, which can be of the disposable type, simultaneously monitor feed, retentate and permeate line pressures. The resulting TMP can be calculated, and associated flow rates can be monitored and/or displayed.

FIG. 2 illustrates an arrangement in this regard. Pressure sensors (P1, P2 and P3) are shown installed in association with the separation unit 24, such as a filtration unit. Sensor P1, which can be associated with an electronic flow meter signal cable, reads the pressure (P1) at the inlet area 28. Sensor P2 reads the pressure (P2) at the retentate outlet area 31, and sensor P3 reads the pressure (P3) at the filtrate outlet area 29. In tangential flow filtration, the driving force (trans-membrane pressure, or TMP) is the difference between the average of the membrane feed pressure (P1) and the retentate pressure (P2) minus the permeate pressure (P3). This is represented by equation (1) as follows: (1) $TMP=(P1+P2)/2-P3$. Also, differential pressure (DP) can likewise be monitored, such being inlet pressure minus retentate pressure, or $DP=P1-P2$. Each of TMP, DP and the inlet pressure (P1) can be manipulated by increasing or decreasing the retentate line pressure (P2), such as by using an electro-pneumatic control valve. In some TFF applications, the permeate line pressure (P3) can also be controlled by a control valve or the like in order to create a non-zero backpressure in the permeate line.

In tangential flow applications where the pump feed pressure (P1), the retentate pressure (P2) and the permeate pressure (P3) are all allowed to change, equation (1) defines the trans-membrane pressure (TMP). Appropriate differential pressure measurements can be made. Retentate recirculation is illustrated in FIG. 2 as beginning at path 36a and moving to path 36b.

If a unit such as that shown in FIG. 2 were to be operated in a constant rate mode, the operator implements a desired pump rate and selects some or all of desired alarm conditions. Examples of these alarm conditions are high pressure, low pressure, feed volume, permeate weight, and one time alarm. The pump rate can be increased or decreased "on the fly" without stopping the pump action. In this constant rate mode, it is possible to increase the feed rate in a stepwise fashion. Particularly high permeate yield is accomplished when the feed rate is increased in a stepwise or constant fashion. Such a feed rate mode can occur while simultaneously monitoring the permeate collection rate.

If a unit such as in FIG. 2 were to be operated at a constant pressure mode, pressure options which typically can be provided are: constant TMP, constant feed pressure (P1), constant retentate pressure (P2) or constant permeate pressure (P3). Such pressure settings also can be increased or decreased "on the fly" without stopping pump action. Typical alarm conditions are low pressure, low flow, accumulated feed volume, accumulated permeate rate, and one time. Setting the alarm criteria can result in either signaling an alarm or stopping the pump, or both. Particularly high permeate yield is accomplished when the TMP is increased in a stepwise or constant fashion. Such a pressure mode can occur while simultaneously monitoring the permeate collection rate.

When an increasing or decreasing flow rate approach is followed, the low flow rate typically will be between about 0.01 ml/minute and about 10 liters/minute, preferably between about 0.1 ml/minute, and about 5 liters/minute. This is increased as generally illustrated herein to between about 1 liter/minute and about 200 liters/minute, preferably between about 10 liters/minute and about 100 liters/minute.

When an increasing pressure approach is followed, the low pressure typically is between about 0.1 psi and about 20 psi, preferably between about 0.5 psi and about 10 psi. This is increased as generally illustrated herein to between about 5 psi and about 100 psi, preferably between about 20 psi and about 75 psi.

A typical operation of a system or process that is exemplified herein is illustrated by the data flow schematic of FIG. 3.

This is for the constant flow to constant pressure switching scheme. After the setting of pump direction and rate and alarm settings, if desired, such as those illustrated in FIG. 7, FIG. 8, FIG. 9 and FIG. 10, a constant pump rate is set as illustrated in the first data loop. This arrangement is for a constant pump rate for dead end filtration. A pressure is set, indicated by the p=x. When this set pressure value is achieved, this pressure is maintained as indicated. A low flow rate "a" had been set by the operator. The constant pressure continues until such time as the "a" value has been reached. At that time, a stop signal is given to the pump motor, and the procedure is terminated. This flow chart also is substantially the same as that for carrying out preparatory chromatography with this constant rate and constant pressure switching scheme approach.

With this switching scheme approach, the constant flow rate portion typically provides a flow rate which remains with a rate range of between about 0.01 ml/minute and about 100 liters/minute, preferably, between about 0.1 ml/minute and about 75 liters/minute. Usually, during the constant flow rate stage, the flow rate varies by not more than about 10 percent, preferably by not more than about 5 percent, most preferably by not more than about 3 percent. When the switch to constant pressure portion takes place, the pressure during this stage is within a generally constant pressure range, which typically is between about 0.1 psi and about 100 psi, preferably between about 1 psi and about 75 psi. Usually, during the constant pressure stage, the pressure varies by not more than about 20 percent, preferably by not more than about 10 percent, most preferably by not more than about 5 percent.

Figure 9:
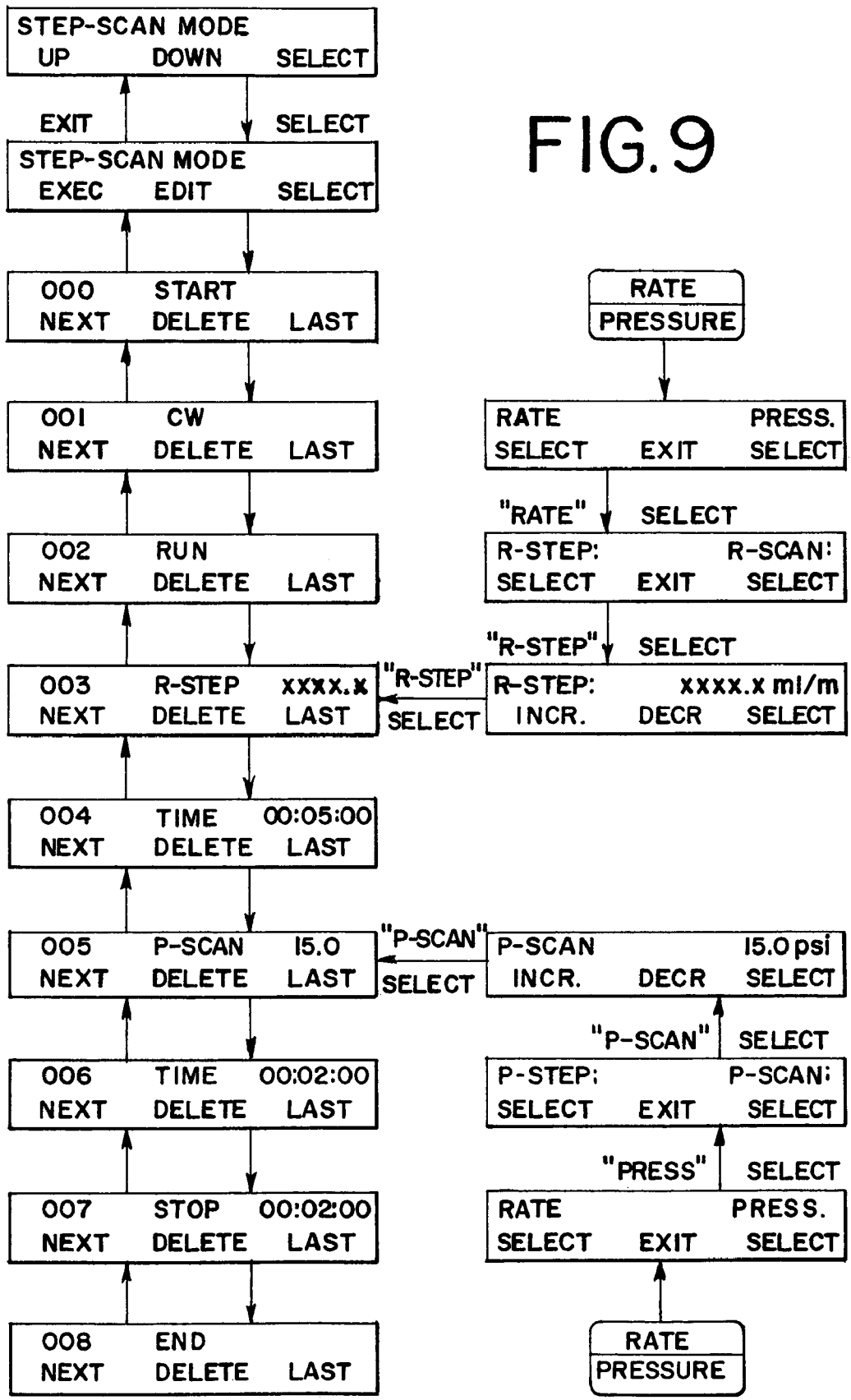
FIG. 9 schematically provides data entry capabilities for step-scan mode implementation in following an increasing rate or pressure scheme.
Figure 10:
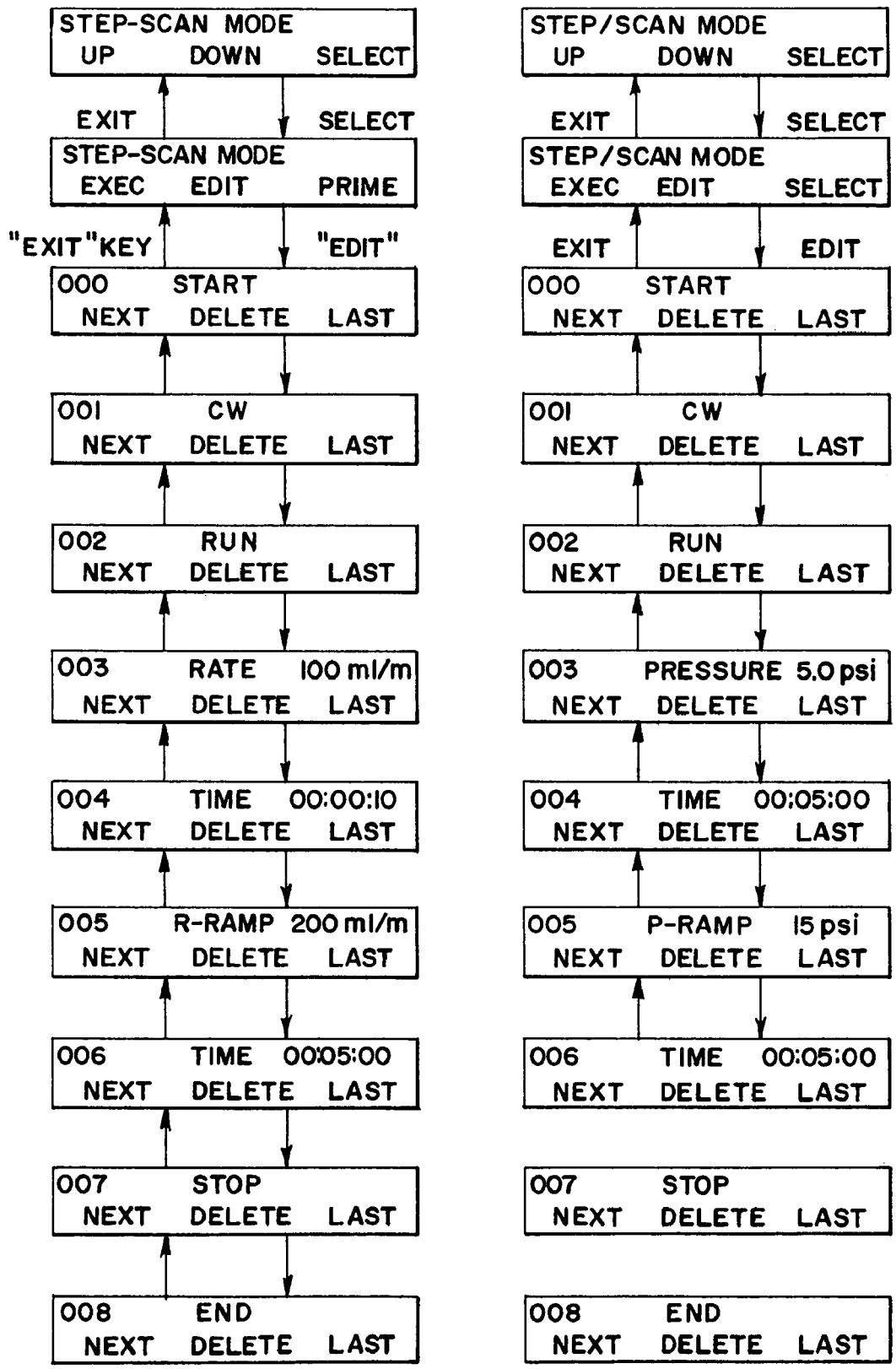
FIG. 10 schematically provides data editing capabilities for step-scan mode implementation in following an increasing flow rate or pressure scheme.

With more particular reference to the data flow charts of FIG. 9 and FIG. 10, these illustrate the embodiments of an increasing pump rate scheme or increasing pressure scheme. Shown are step-scan modes for providing time-programmable pressure and/or pump rate scans. FIG. 9 illustrates data entry, and FIG. 10 illustrates edit steps. For example, operator-defined scan rates can scan pressure from 0 to 30 psi over a 10 minute time interval, followed by a constant pressure enterable at, for example 30 psi. This operational mode is useful in optimizing filtration procedures.

Methods and systems generally describe herein significantly improve the economics of direct flow filtration (or dead end filtration), tangential flow filtration and preparative chromatography. A microprocessor-controlled operator interface is the illustrated manner of programming the pump mechanism for achieving desired pressure and/or pump rate values and/or changes, including over an operator-defined time interval and/or for an operator-defined volume or weight.

From the point of view of direct flow filtration or tangential flow filtration, costly filter failures are avoided and improved filtration times and yields are realized by automatically increasing the pump rate over time. Starting with a low, initial pump rate, the pump feed rate into the filter is progressively and automatically increased. The increase of pump rate over time can be accomplished in a step-wise fashion or in smooth, continuous rate increase (scanning) over time. The pump rate increase by either the step or scanning method is operator-definable and controlled in the pump software. Both pump rate procedures allow optimization of the filtration process with respect to filtration volume, filtration time as well as filtration pressure. In this embodiment, the filtration procedure is terminated when an upper, operator-defined, pump rate, pressure, volume or time limit has been achieved.

In another embodiment, filtration pressure is increased over time. With this approach, the pressure increase over time can be achieved in a step-wise fashion or in a smooth, continuous pressure increase (scanning) over time. For DFF, the pressure step and pressure scanning procedures include the use of at least one pressure transmitter located in the fluid between the pumping system and the filtrate collection vessel. A software-controlled feedback loop between the pressure transmitter and the pump electronics provides an increased pump output over time such that the measured filter pressure varies in an operator-defined manner. In the scanning mode, the automated, operator-defined increase of filter pressure can vary in a linear, non-linear (e.g. exponential), or intermittent fashion over time.

In a further handling procedure embodiment, filtration economics are improved by setting a constant flow rate of penetration until a preselected pressure limit is reached. At this point, the microprocessor-controlled pumping system automatically switches to a constant pressure filtration mode during which the pump output is modulated to maintain the user-defined pressure limit. The filtration procedure is automatically terminated when a user defined lower pump output or time limit is obtained.

The pressure step and scanning procedures also can be effectively used with filter trains typically consisting of a series of in-line DFF filters of different filter porosity. This approach is suitable for complex biopharmaceutical solutions in order to remove progressively smaller particles from the solution that otherwise would severely limit the capacity of the final filter element. In this case, pressure transmitted can be located in-line and between neighboring filter elements as well as in front of the first filter element of the filter train. The controlled pressure increase by either the step or scanning method, across the filter train or across neighboring filter elements is used for evaluating and optimizing the porosity of individual filter elements as well as for optimizing the filtration yield (i.e. filtrate volume) of a given filter train.

Other embodiments are for preparative chromatography uses. Manual pump rate adjustment during column loading cycles are averted by using the constant-pressure column loading approach. By this approach, a safe loading pressure is selected that lies below the pressure rating for the preparative chromatographic column and also avoids compaction of the stationary column matrix. A safe pressure range for preparative column loading is in the approximate 5 to 20 psi range. For larger diameter preparative columns, pressure settings in the lower portion of such a range should be used.

Analogous to the step/scan pressure filtration procedures outlined above, constant-pressure column loading is best handled by having at least one pressure sensor or transmitter located between the loading pump and the chromatographic column. By providing a software controlled feedback loop between the pressure transmitter and the pump electronics, pump output increases until the operator-selected column pressure has been attained. At this point, the pump output is modulated to maintain a constant column pressure. Retention of the desired bio-molecules and/or retention of solution contaminants onto the column stationary phase over time will gradually increase flow resistance and thus column pressure. The software controlled pumping system will respond to this pressure increase by automatically decreasing the pump output until the selected column pressure is again reestablished. Thus, the pump output time profile will show a high, initial pump output, which progressively decreases over time in response to an increase in column flow resistance, while maintaining a safe and constant column pressure. The self-regulating nature of this column-loading strategy requires no human intervention.

Another embodiment for preparative chromatography loads the column or columns by a constant flow rate until an operator-defined pressure limit is reached. At this point, the microprocessor controlled pumping system automatically switches to a constant pressure loading mode during which the pump output is modulated to maintain the user-defined pressure limit. The column loading procedure is automatically terminated when an operator-defined volume has been loaded (pumped) onto the column.

In addition, the software-controlled pumping system optionally has a stored, on-board calibration curve relating motor RPM to pump output. This feature allows the pump to monitor and display the total process solution volume that has been pumped to the column. When the user-defined volume limit has been reached, the pump will issue an alarm signal and/or stop the pumping action or proceed to the next step in the stored chromatography program.

Alternatively, an electronic bubble detector (i.e. a Wedgewood detector) can be placed in-line with the process solution reservoir and be connected to the pump electronics. When the reservoir has been emptied, air is drawn into the fluid line, which is detected by the bubble detector. A signal is generated by the bubble detector, which will either stop the pumping action or proceed to the next step in the stored chromatography program.

EXAMPLE 1

In the bioprocessing industry, solutions are filtered by DFF using either constant pressure or constant flow rate. For a given bioprocess solution, the standard procedure for determining (DFF) filter capacity involves the use of pressurized SS containers. The pressurized (20 psi) SS vessel containing the bioprocess solution replaces the pump and reservoir shown in FIG. 1. A fluid line with shutoff valve connects the pressurized vessel with the DFF device to be tested. The test procedure starts with the opening of the manual shut-off valve. The filtrate quantity is measured with an electronic scale; filtration data is collected at regular time intervals.

Figure 4:
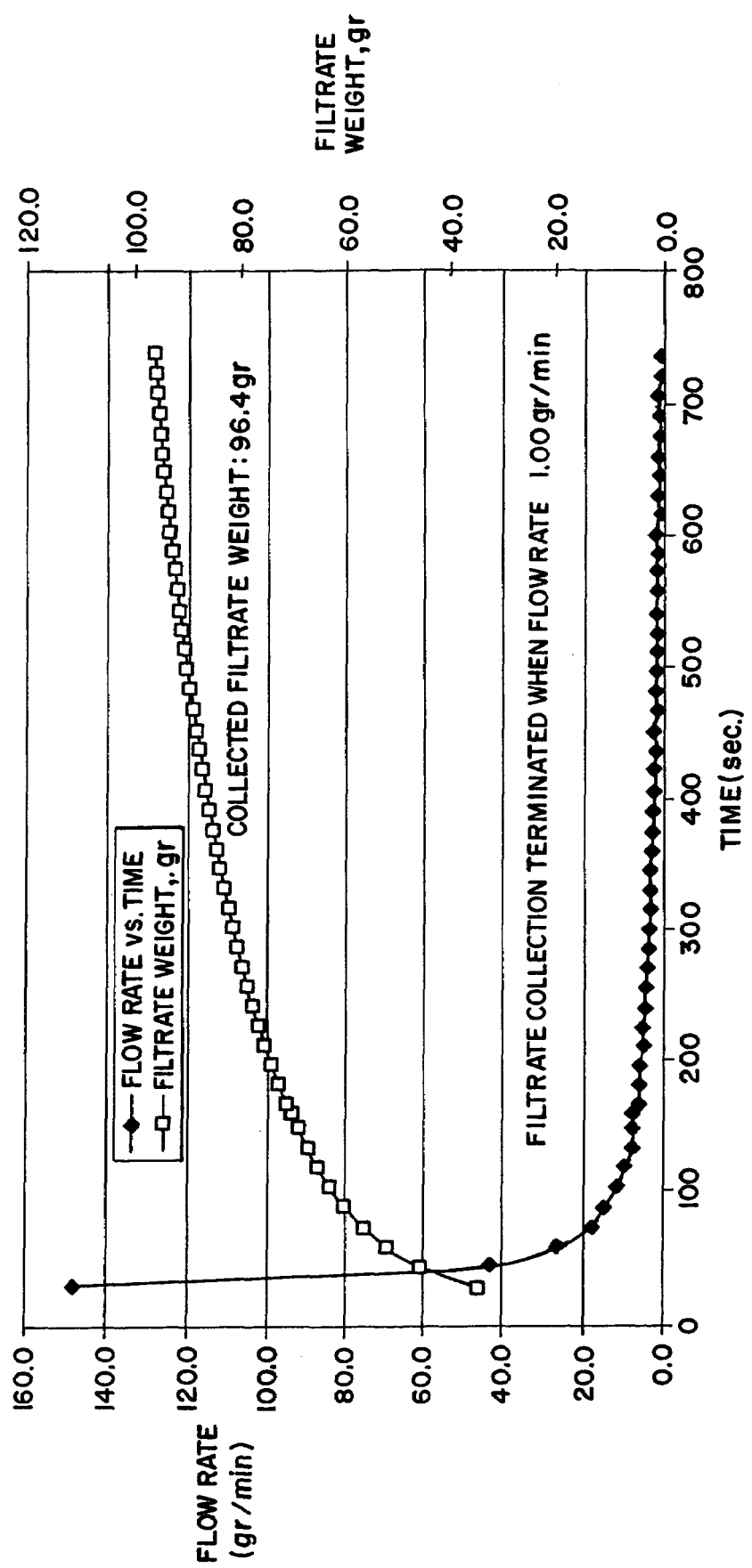
FIG. 4 is a plot of dead end filtration under a constant pressure condition, showing change in flow rate over time as well as collected filtrate weight.

The standard test procedure outlined above was used to generate comparative baseline data generally as follows. A 4-liter SS container was filled with 1.0 liter of a surrogate protein solution, consisting of skimmed, fat-free milk (9 grams of protein/liter) diluted 20:1 with water. The SS vessel containing the surrogate protein solution was air-pressurized to 20 psi. A cellulose acetate membrane filter with a 0.45 micron pore size and a 47 mm diameter was used. The filtrate was collected and measured with an electronic scale. FIG. 4 summarizes the flow rate and the filtrate collection weight data under this constant pressure condition. At a constant pressure of 20 psi, an initial flow rate of 150 ml/min was measured. As evident in FIG. 4, the flow rate quickly decayed because of progressive membrane clogging, with the test automatically stopping after the flow rate had decayed to a pre-selected low flow limit of 1.0 ml/min. The collected filtrate weight was 96.4 grams.

EXAMPLE 2

Constant rate filtration with a constant pressure condition was carried out on a unit generally in accordance with FIG. 1. A constant pump rate of 15 ml/min was implemented until a backpressure of 20 psi was reached. At this point, the processor-controlled pump unit switched automatically to a constant pressure delivery by modulating the pump output in order to maintain the 20 psi pressure level. An operator-defined low flow alarm setting of 1.0 ml/min was reached, and the unit automatically stopped pumping to complete the processing.

Figure 5:
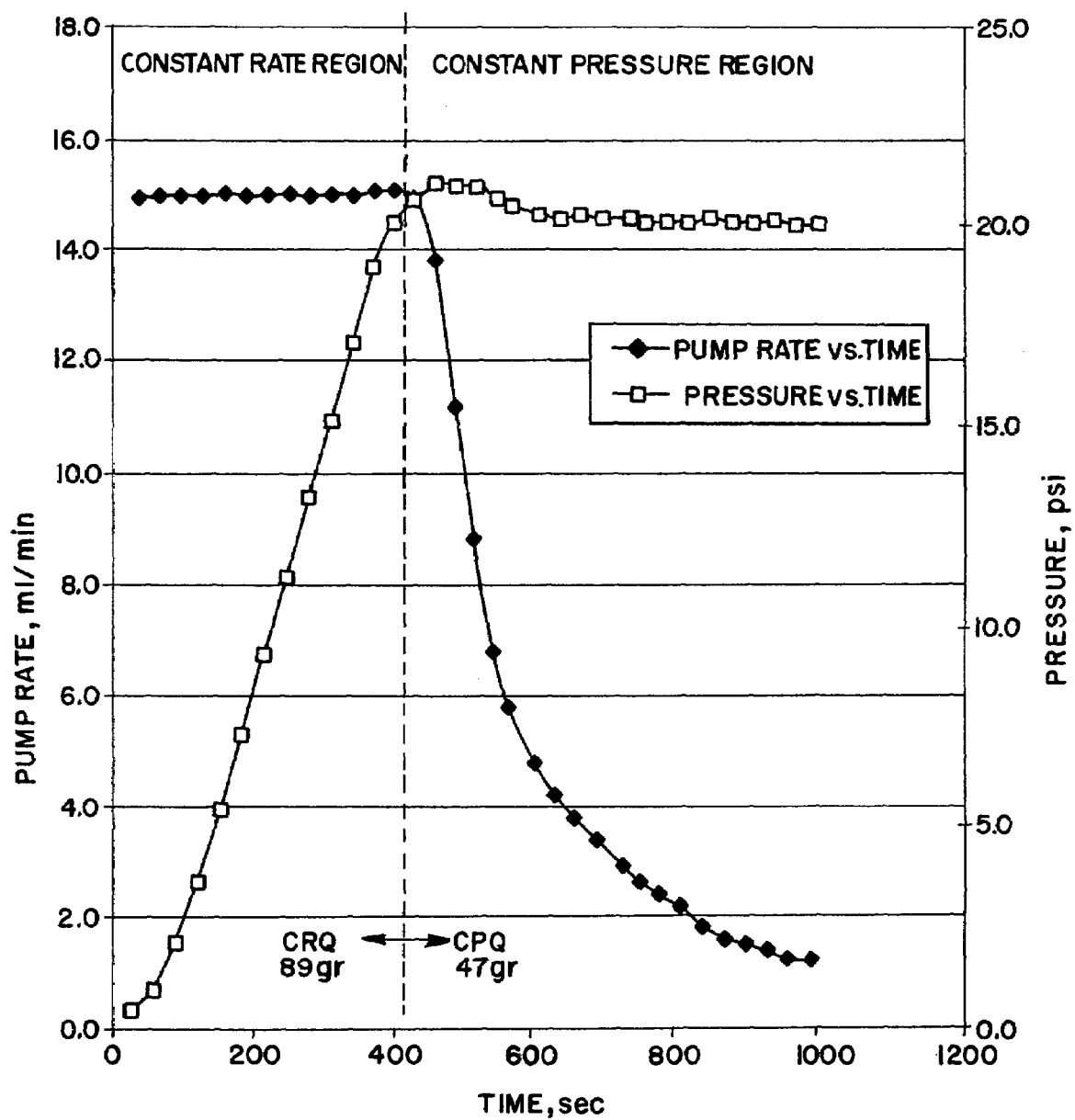
FIG. 5 is a plot of dead end filtration at a constant pump rate until a constant backpressure is reached in maintaining the constant pressure until minimal flow rate is encountered.

FIG. 5 provides data from this dead end filtration approach with an MFS cellulose acetate membrane filter having a 0.45 micron porosity and a filter area of 1.73 square centimeters. A dilute milk solution as described in Example 1 was used as the surrogate protein solution. The area under the pump rate versus time curve of FIG. 5 represents the total, collected filtrate rate, which was 136 grams or 7.86 grams per square centimeter of filter area. FIG. 5 illustrates differences between filtrate weight (89 grams) collected under a constant pump rate versus the filtrate weight (46 grams) collected under constant pressure conditions. The 96.4 grams collected under constant pressure conditions in Example 1 compares reasonably well with the filtrate weight (89 grams) collected under the constant rate condition of this Example 2. It is noted that the actual total collected filtrate weight is 136 grams, considerably more than the constant pressure approach of Example 1.

Although not wishing to be bound by any theory for explaining this considerable difference, it is postulated that two filter membrane domains are utilized during dead end filtration. A high-flux membrane domain is available during constant low-flow filtration, while a low-flux membrane domain is utilized primarily during high flow rate, high pressure filtration conditions. The high-flux membrane requires a relatively low pressure differential in order to pass filtrate therethrough, whereas the low-flux membrane requires a relatively high pressure differential. At high pump rates, the high-flux areas are quickly plugged and become rapidly unavailable for further filtrate flux.

A possible mechanism for the observed filter plugging behavior can be illustrated by considering FIG. 5. The slope of pressure versus time has an extended linear segment, which becomes increasingly pronounced at higher pump rates and higher pressures. Filtration throughput data were collected at different pump rates and constant pressure limits (20 psi) as well as at a constant pump rate (25 ml/min) and at different pressure limits. In the pressure range of from 20 to 35 psi, the total collected filtrate varied from 162 grams (at 20 psi) to 227 grams at 35 psi, with the largest contribution to total filtrate quantity being made by the constant rate filtrate quantity. The constant pressure filtrate quantity, on the other hand, remained almost constant in pressure limit range from the 25 psi run to the 35 psi run.

EXAMPLE 3

Figure 6:
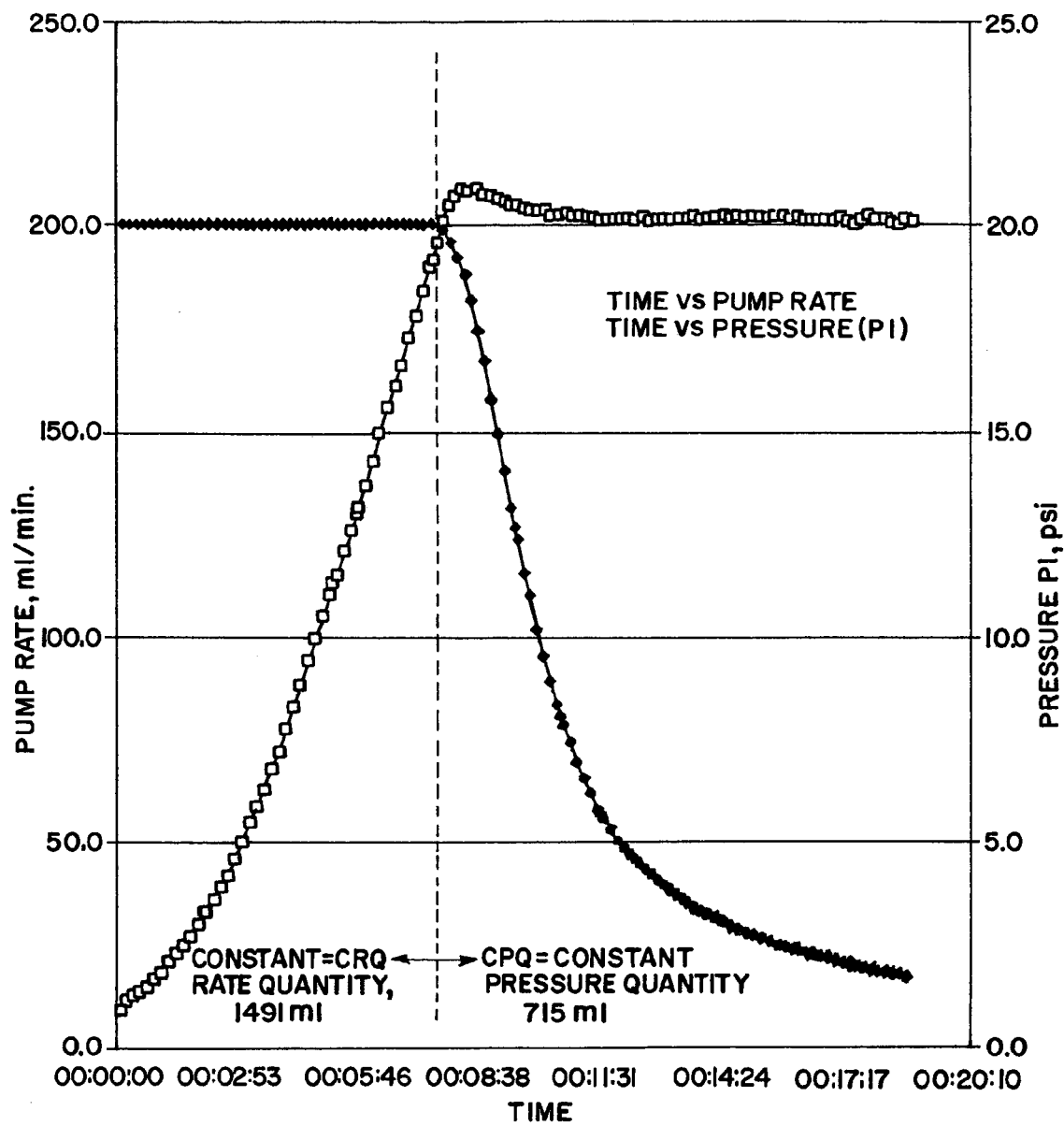
FIG. 6 is a plot of dead end filtration with a scaled-up membrane filter surface, showing constant flow rate to constant pressure over time.

The procedure of Example 2 was generally followed, but on a larger scale. A 300 square centimeter SARTOBRAN™ 300 cellulose acetate membrane filter. This had a porosity of 0.45 microns for the prefilter element, followed by a 0.20 micron final filter. Distilled, deionized water was pumped through this separation unit before processing was begun. Data were generated and are reported in FIG. 6. This filtration proceeded under constant rate and then constant pressure qonditions. The total filtrate weight was 2,206 grams, with the constant rate mode contributing 1,491 grams while the constant pressure mode added 715 grams.

EXAMPLE 4

Figure 11:
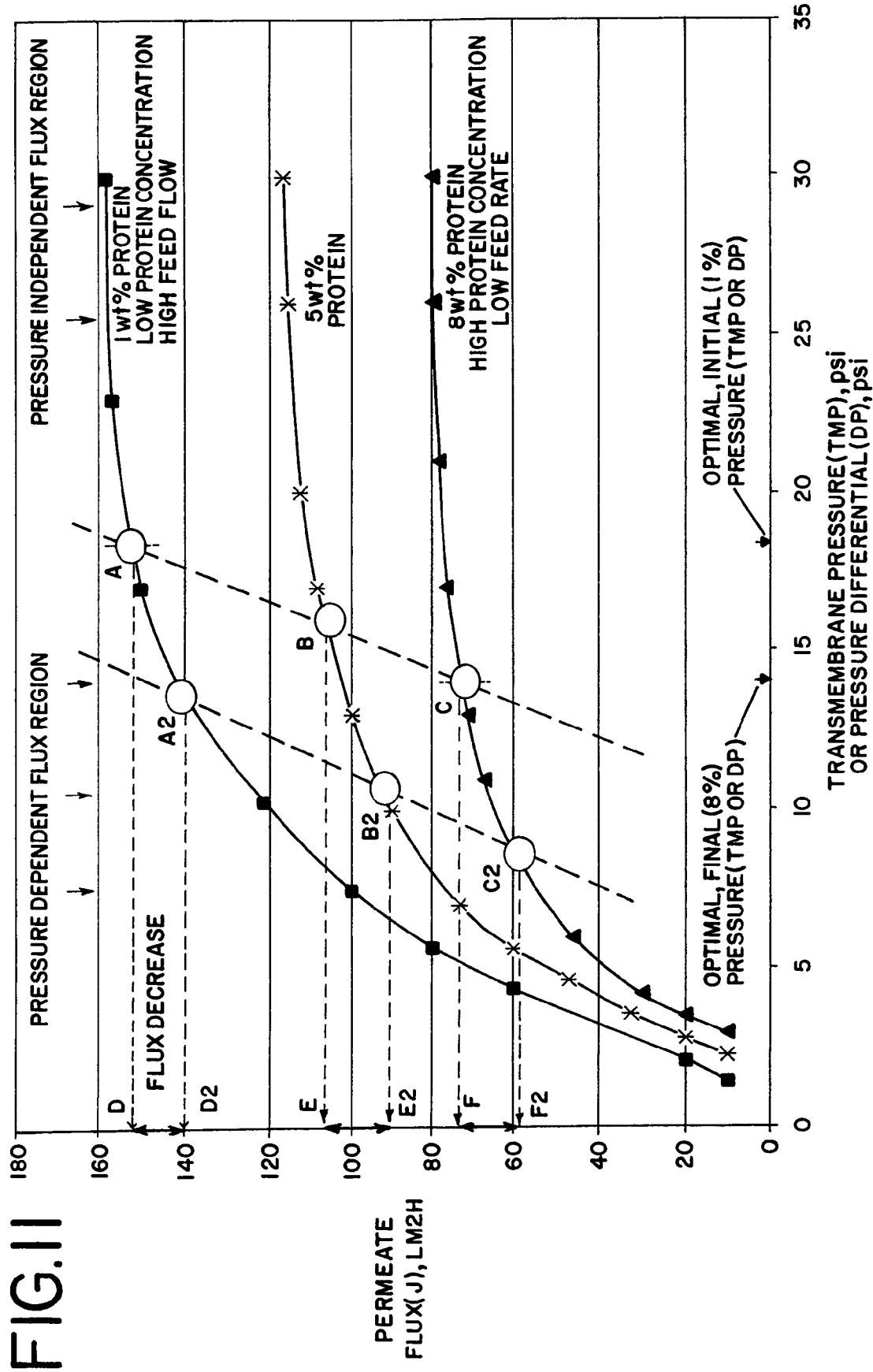
FIG. 11 is a plot of transmembrane pressure versus permeate flux which illustrates optimization of procedures and systems for collection of bio-molecules.

An automated TFF procedure is optimized for concentrating a protein solution by experimentally developing data as illustrated in FIG. 11. This illustrates how benefits are achieved with experimentally determined optimal conditions which are automatically maintained throughout the automated TFF procedure without operator intervention.

Referring to FIG. 11, moving from point "A" at the start of the concentration procedure (a 3% solution), to a point "B" (a 5% solution) and point "C" (an 8% solution) moves from the initial concentration to a terminating or final protein concentration. It will be seen that the TMP (or DP) decreases from an initial 18 psi level at point "A" to the lower 13 psi level at point "C". The resulting permeate flux decrease can be followed by moving from point "D" (about 150 LM2H) to point "E" (about 120 LM2H).

TFF operations utilizing an alternative set of TMP (or DP) parameters which would be considered less optimal are illustrated by line made by points "A2", "B2" and "C2", which runs to the left of and parallel to the line of points "A", "B" and "C". This line to the left is less optimal since it produces lower permeate flux at the three different protein concentration levels. While moving to the right of line "ABC" (into the Pressure Independent Flux Region) might appear to be more promising because it is shown to somewhat increase permeate flux, this actually results in a higher concentration of protein at the membrane wall. This high concentration level would create a protein gradient (osmotic pressure gradient) back into the bulk of the retentate, thereby effectively reducing the applied TMP across the membrane.

Optimal TFF pressure and flow parameters are implemented for any given system by experimentally generating "Flux vs. TMP" curves such as those shown in FIG. 11 during a TFF investigative phase. Once such data are collected, optimized TMP parameters are obtained such as by the graphical method illustrated in FIG. 11, allowing for proper programming to have the unit in essence follow parameter changes so as to lie generally along line "ABC". For example, in a TFF operation, the TMP (or DP) is automated for optimal operation by having the high pressure at "A" change over time to the final pressure at "C" when following a high pressure decreasing to low pressure scheme. Similar data can be generated and used for a high flow rate decreasing to low flow rate scheme, as well as from a control combination of high pressure and flow rate decreased to a low pressure and flow rate combination. In all three cases, a flow meter regulated pump output and/or a pressure regulated control valve are utilized to maintain optimal TFF parameter control.

EXAMPLE 5

A dead end filter is used in a system generally in accordance with FIG. 1. A constant rate, followed by a constant pressure procedure is carried out with a biotechnology fluid. An operator-defined pump rate of 100 ml/min proceeds until an operator-selected upper pressure limit of 20 psi is attained as a result of filter plugging. At this point the system automatically switches from a constant rate to a constant pressure fluid delivery. The pump output is automatically regulated to maintain the selected pressure limit. With progressively increasing filter plugging, the pump output decays until 0.5 ml/min is reached, this being the low pump rate limit. At this point, pumping ceases. This approach fully utilizes existing filter capacity and is accompanied by a significant increase in total filter throughput which is about 35 percent when compared with constant pressure throughput.

EXAMPLE 6

A step-scan approach is used in dead end filtration. The pump rate is modified over a selected time interval through a pump rate scan, this being a continuous changing of the pump rate from 25 ml/min to 250 ml/min over a selected time interval. The same continuous changing is alternatively provided over a continuously changing filtrate volume. A filter pressure scan is provided by which the filter inlet pressure changes linearly over 15 minutes until a selected pressure of 20 psi is attained.

It will be understood that the embodiments of the present invention which have been described are illustrative of some of the applications of the principles of the present invention. Numerous modifications may be made by those skilled in the art without departing from the true spirit and scope of the invention, including those combinations of features that are individually disclosed or claimed herein.

The invention claimed is:

1. A method for high-precision separation of pharmaceutical or biotechnology liquids by direct flow filtration, comprising:
    providing within a reservoir a pharmaceutical or biotechnology liquid having target bio-molecules dissolved or suspended within a carrier liquid;
    controlling movement of the pharmaceutical or biotechnology liquid within a flow path which includes moving the liquid from the reservoir to a direct flow filtration separation unit having an inlet and an outlet;
    monitoring pressure at a location along the flow path;
    passing the liquid containing target bio-molecules through the inlet of the direct flow filtration separation unit to separate at least some of the target bio-molecules therefrom;
    controlling movement of the liquid containing target bio-molecules to the separation unit, said controlling movement including:
        initially moving the liquid containing target bio-molecules to the separation unit at a low pressure rate of flow of said liquid within a constant flow rate range during a constant flow rate direct flow filtration stage,
        selecting a switching scheme by which the constant flow rate stage for the liquid containing target bio-molecules ceases and a constant pressure direct flow filtration stage within the flow path is initiated at a switching point that is reached at substantially the same time at which the constant flow rate direct flow filtration stage ceases,
        defining the switching point according to achievement of a predetermined high pressure value at a pressure monitoring location within the flow path, and
        automatically ceasing, at the switching point, the constant flow rate direct flow filtration stage by modulating flow of the liquid and allowing the flow rate to reduce toward a low flow rate that is slower than the constant flow rate range, and then automatically increasing the pressure within the flow path from said low pressure toward the constant pressure range within the flow path, thereby initiating said constant pressure direct flow filtration stage at approximately the switching point, said constant pressure range being greater than said low pressure, and said ceasing and initiating being according to said switching scheme; and
    collecting target bio-molecules as a purified pharmaceutical or biotechnology product of purified target bio-molecules by separating same from the carrier liquid and undesirable contaminants.

2. The method in accordance with claim 1, further including incorporating a feedback loop for transmitting parameter information in association with said controlling movement of the liquid.

3. The method in accordance with claim 1, wherein the moving of the liquid to the separation unit includes providing a plurality of separation units having filtration porosities which differ in pore size, further including providing separation units of different pore sizes in an in-line fashion.

4. The method in accordance with claim 1, wherein the constant flow rate range is between about 0.01 ml/minute and about 100 liters/minute, and wherein the constant pressure range is between about 0.1 psi and about 100 psi, each said range being affected by size and material of separation unit components which contact the target bio-molecules.

5. The method in accordance with claim 4, wherein the flow rate varies by not more than about 10 percent during the constant flow rate stage, and wherein the pressure varies by not more than about 20 percent during the constant pressure stage.

6. The method in accordance with claim 1, wherein said collecting occurs once a defined volume of liquid has been processed, as determined by a calibration curve that relates pump RPM to pump output and signals when the defined volume has been achieved.

7. A method for high-precision separation of pharmaceutical or biotechnology liquids by direct flow filtration, comprising:
   providing within a reservoir a pharmaceutical or biotechnology liquid having target bio-molecules dissolved or suspended within a carrier liquid;
   controlling movement of the pharmaceutical or biotechnology liquid within a flow path which includes moving the liquid from the reservoir to a direct flow filtration separation unit having an inlet and an outlet;
   passing the liquid containing target bio-molecules through the inlet of the direct flow filtration separation unit to separate at least some of the target bio-molecules therefrom;
   controlling movement of the liquid containing target bio-molecules to the separation unit, said controlling movement including:
      initially moving the liquid containing target bio-molecules to the separation unit at a low direct flow filtration rate of flow of said liquid,
      selecting a flow rate increase switching scheme by which the flow rate of the liquid containing target bio-molecules is increased from the low rate of flow to a high rate of flow of said liquid,
      defining the high flow rate according to achievement of a predetermined value of a parameter within the flow path, said predetermined parameter value being selected from the group consisting of a maximum flow rate, a maximum pressure along the flow path, a predetermined volume, and a time limit, and
      automatically increasing the rate of flow of said liquid to the direct flow filtration separation unit from the low flow rate to the high flow rate according to the flow rate increase scheme, said increasing automatically terminating upon achievement of the predetermined parameter value; and
      collecting target bio-molecules as a purified pharmaceutical or biotechnology product of purified target bio-molecules by separating same from the carrier liquid and undesirable contaminants.

8. The method in accordance with claim 7, wherein said flow rate increase scheme automatically and progressively increases the flow rate in a step-wise fashion.

9. The method in accordance with claim 7, wherein said flow rate increase scheme automatically and progressively increases the flow rate in a continuously increasing fashion.

10. The method in accordance with claim 7, wherein said method further includes monitoring a selected parameter at or downstream of the outlet from said separation unit in order to detect undesired forced passage of bio-molecules through the separation unit.

11. The method in accordance with claim 10, wherein said selected parameter of the monitoring is target bio-molecule concentration, measured by means selected from the group consisting of ultraviolet light, conductivity and combinations thereof.

12. The method in accordance with claim 7, further including incorporating a feedback loop for transmitting information on said parameter in association with said controlling movement of the liquid for facilitating said increasing of the flow rate to the separation unit.

13. The method in accordance with claim 7, wherein the moving of the liquid to the separation unit includes providing a plurality of separation units having filtration porosities which differ in pore size, further including providing separation units of different pore sizes in an in-line fashion.

14. The method in accordance with claim 7, wherein the low flow rate is between about 0.01 ml/minute and about 10 liters/minute, and wherein the high flow rate is between about 1.0 liter/minute and about 200 liters/minute, each flow rate range being affected by size and material of separation unit components which contact the target bio-molecules.

15. A method for high-precision separation of pharmaceutical or biotechnology liquids by direct flow filtration, comprising:
   providing within a reservoir a pharmaceutical or biotechnology liquid having target bio-molecules dissolved or suspended within a carrier liquid;
   controlling movement of the pharmaceutical or biotechnology liquid within a flow path which includes moving the liquid from the reservoir to a direct flow filtration separation unit having an inlet and an outlet;
   monitoring pressure at a pressure monitoring location along the flow path;
   passing the liquid containing target bio-molecules through the inlet of the direct flow filtration separation unit to separate at least some of the target bio-molecules therefrom;
   controlling movement of the liquid containing target bio-molecules to the separation unit, said controlling movement including:
      initially moving the liquid containing target bio-molecules to the separation unit while the pressure monitoring location registers a direct flow filtration low pressure of said liquid,
      selecting a pressure increase switching scheme by which the pressure of the liquid containing target bio-molecules is increased from the low pressure to a high pressure of said liquid,
      defining the high pressure according to achievement of a predetermined direct flow filtration high pressure value at the pressure monitoring location, and
      automatically increasing the pressure from the low pressure to the high pressure according to the pressure increase scheme, said pressure increase being effected by increasing flow resistance resulting from increasing filter blockage, said increasing automatically terminating upon achievement of the predetermined high pressure value along
   the flow path; and
   collecting target bio-molecules as a purified pharmaceutical or biotechnology product of purified target bio-molecules by separating same from the carrier liquid and undesirable contaminants.

16. The method in accordance with claim 15, wherein said pressure increase scheme automatically and progressively increases the pressure in a step-wise fashion.

17. The method in accordance with claim 15, wherein said pressure increase scheme automatically and progressively increases the pressure in a continuously increasing fashion.

18. The method in accordance with claim 15, further including incorporating a feedback loop for transmitting parameter information in association with said controlling movement of the liquid for facilitating said increasing of the pressure along the flow path.

19. The method in accordance with claim 15, wherein the moving of the liquid to the separation unit includes providing a plurality of separation units having filtration porosities which differ in pore size, further including providing separation units of different pore sizes in an in-line fashion.

20. The method in accordance with claim 15, wherein the low pressure is between about 0.1 psi and about 20 psi, and wherein the high pressure is between about 5 psi and about 100 psi, each said pressure range being affected by size and material of separation unit components which contact the target bio-molecules.

* * * * *

UNITED STATES PATENT AND TRADEMARK OFFICE
CERTIFICATE OF CORRECTION

PATENT NO. : 7,410,587 B2
APPLICATION NO. : 10/910065
DATED : August 12, 2008
INVENTOR(S) : Karl G. Schick It is certified that error appears in the above-identified patent and that said Letters Patent is hereby corrected as shown below:

Title page, Item (56), under "Other Publications", page 1, "Haschmeyer" should read --Haschemeyer--.
Title page, Item (56), under "Other Publications", page 2, Blatt, et al., insert --and Technology-- after "Separation Science"; Operating Instructions, "Microgeon" should read --Microgon--; Ultratec Filtration System, delete the comma and quotation marks after "Version" and insert quotation marks after "1.28,"; Si-Hassen, et al., "Intermittant" should read --Intermittent--; Webpage of Integrate Solution for Biopharmeaceutical Fluid Handling, insert quotation marks before "Integrate", insert quotation marks after "Handling", and "Biopharmeaceutical" should read --Biopharmaceutical--.

Col. 1, line 18, "micro-,ultra-," should read --micro-, ultra-,--.

Col. 2, line 57, "pressured" should read --pressure--; line 64, "product" should read --products--.

Col. 3, line 25, "uneconomic" should read --uneconomical--.

Col. 4, line 43, "use interface" should read --user interface--; line 51, insert --the-- before "total process solution".

Col. 7, line 30, insert --in-- after "pressure sensor 34".

Col. 8, line 7, delete "0" after ""hard""; line 10, insert --the-- after "interrupts"; line 39, insert --that-- before "can be selected".

Col. 11, line 41, "describe" should read --described--; line 55, insert --a-- before "smooth".

Col. 12, line 35, "adjustment" should read --adjustments--.

Col. 14, line 43, insert --the-- before "pressure limit range"; line 49, "SARTOBRANTM" should read --SARTOBRAN-- with a superscript --TM-- following.

UNITED STATES PATENT AND TRADEMARK OFFICE
CERTIFICATE OF CORRECTION

PATENT NO. : 7,410,587 B2
APPLICATION NO. : 10/910065
DATED : August 12, 2008
INVENTOR(S) : Karl G. Schick It is certified that error appears in the above-identified patent and that said Letters Patent is hereby corrected as shown below:

Col. 15, line 12, insert --the-- before "line"; line 14, insert --a-- before "lower".

Signed and Sealed this

Thirteenth Day of January, 2009

JON W. DUDAS
*Director of the United States Patent and Trademark Office*